United States Patent

Warren et al.

[11] Patent Number: 6,075,807
[45] Date of Patent: Jun. 13, 2000

[54] WINDOWED DIGITAL MATCHED FILTER CIRCUIT FOR POWER REDUCTION IN BATTERY-POWERED CDMA RADIOS

[75] Inventors: Bruce G. Warren, Poulsbo; Alan F. Jovanovich, Des Moines; John W. Mensonides, Monroe, all of Wash.

[73] Assignee: Intermec IP Corp., Woodland Hills, Calif.

[21] Appl. No.: 08/826,347

[22] Filed: Mar. 25, 1997

[51] Int. Cl.[7] .............................. H04B 15/00; H04K 1/00; H04L 27/30

[52] U.S. Cl. .......................... 375/143; 375/142; 375/150; 375/152; 375/343; 370/335; 370/342; 370/441; 370/479

[58] Field of Search ...................................... 375/207, 343, 375/208, 206, 143, 150, 152, 142; 370/342, 479, 343, 441, 335

[56] References Cited

U.S. PATENT DOCUMENTS

| | | |
|---|---|---|
| 3,604,911 | 9/1971 | Schmitt .................................... 708/422 |
| 4,032,885 | 6/1977 | Roth ........................................ 708/212 |
| 4,506,386 | 3/1985 | Ichikawa et al. . |
| 4,523,332 | 6/1985 | Mori . |
| 4,663,623 | 5/1987 | Lax et al. . |
| 4,736,390 | 4/1988 | Ward et al. . |
| 4,745,408 | 5/1988 | Nagata et al. . |
| 4,755,983 | 7/1988 | Masak et al. ............................ 375/207 |
| 4,837,854 | 6/1989 | Oyagi et al. . |
| 4,839,639 | 6/1989 | Sato et al. . |
| 4,903,335 | 2/1990 | Shimizu . |
| 5,216,691 | 6/1993 | Kaufmann ............................... 375/150 |
| 5,230,084 | 7/1993 | Nguyen . |
| 5,239,557 | 8/1993 | Dent . |
| 5,241,561 | 8/1993 | Barnard . |
| 5,241,566 | 8/1993 | Jackson . |
| 5,293,398 | 3/1994 | Hamao et al. .......................... 375/152 |
| 5,381,133 | 1/1995 | Erhart et al. . |
| 5,410,734 | 4/1995 | Choi et al. . |
| 5,420,850 | 5/1995 | Umeda et al. .......................... 370/342 |
| 5,440,298 | 8/1995 | Kuramatsu . |
| 5,495,500 | 2/1996 | Jovanovich et al. . |
| 5,537,100 | 7/1996 | Hallberg . |
| 5,687,190 | 11/1997 | Tsao ....................................... 375/142 |
| 5,784,403 | 7/1998 | Scott ....................................... 375/151 |
| 5,818,868 | 10/1998 | Gaudenzi et al. ...................... 375/152 |
| 5,903,595 | 5/1999 | Suzuki .................................... 375/207 |

*Primary Examiner*—Stephen Chin
*Assistant Examiner*—Michael W. Maddox
*Attorney, Agent, or Firm*—O'Melveny & Myers LLP

[57] ABSTRACT

A digital matched filter for a CDMA radio comprises a digital delay line having a plurality of successive delay stages adapted to receive a digital signal and propagate the digital signal therethrough at a fixed rate. A correlator is coupled to the digital delay line to correlate the digital signal to a predefined spreading code to provide a correlation signal representing a degree of correlation of the digital signal to the spreading code. A window logic unit is coupled to the correlator to enable operation of the correlator only during successive discrete time periods of the correlation signal corresponding to a high degree of correlation of the digital signal to the spreading code.

21 Claims, 2 Drawing Sheets

WINDOWED DIGITAL MATCHED FILTER CIRCUIT FOR POWER REDUCTION IN BATTERY-POWERED CDMA RADIOS

BACKGROUND OF THE INVENTION

1. Field of the Invention

The present invention relates to direct sequence spread spectrum communications, and more particularly, to a radio receiver that conserves electrical power by performing certain processing of received data only during a narrow window corresponding to an estimated bit synchronization time.

2. Description of Related Art

Spread spectrum modulation techniques are increasingly desirable for communications, navigation, radar and other applications. In a spread spectrum system, the transmitted signal is spread over a frequency band that is significantly wider than the minimum bandwidth required to transmit the information being sent. As a result of the signal spreading, spread spectrum systems have reduced susceptibility to interference or jamming, and enable high data integrity and security. Moreover, by spreading transmission power across a broad bandwidth, power levels at any given frequency within the bandwidth are significantly reduced, thereby reducing interference to other radio devices. In view of these significant advantages, spread spectrum communication systems are highly desirable for commercial data transmission.

In one type of spread spectrum communication system, a radio frequency (RF) carrier is modulated by a digital code sequence referred to as a spreading code. The spreading code has a bit rate, or chipping rate, much higher than a clock rate of the underlying information signal. These spread spectrum systems are known as direct sequence (DS) or code division multiple access (CDMA) modulation systems. The RF carrier may be binary or quadrature modulated by one or more data streams such that the data streams have one phase when the spreading code represents a data "one" and a predetermined phase shift (e.g., 180° for binary, and 90° for quadrature) when the spreading code represents a data "zero." These types of modulation are commonly referred to as binary shift key (BPSK) and quadrature shift key (QPSK) modulation, respectively.

It is also known to use a plurality of CDMA radio receivers that are coupled together in a wireless local area network (WLAN). A central host processing unit could send information to and receive information from any one of the plurality of remotely disposed receivers. In such a WLAN, the remote receivers may comprise portable units that operate within a defined environment to report information back to the central host processing unit. Each of the remote receivers would communicate with the host processing unit using the same RF carrier frequency and spreading code. It should be apparent that such WLAN systems offer increased flexibility over hard-wired systems by enabling operators of the remote receivers substantial freedom of movement through the environment.

Each individual CDMA radio receiver amplifies and filters an RF signal transmitted from the host processing unit to remove the RF carrier and provide a digital information signal that has been modulated by the spreading code. The receiver then "de-spreads" the digital signal in a digital processing stage that includes a digital matched filter correlated with the spreading code to remove the modulation and recover the digital information. Tracking and bit synchronization logic units synchronize the timing of the digital matched filter to the received signal by generating a data output containing despread digital information recovered from the received signal and a regulated clock output to which the data output is synchronized. Thereafter, the digital information is combined into packets having a predefined format and length. The packets can then be processed subsequently by use of conventional data processing logic systems, such as a microprocessor, digital signal processor, and the like.

A drawback with such wireless systems is the limited power source of the remote receivers. To maximize flexibility and freedom of movement, the remote receivers often include a rechargeable battery system. When not in use, the remote receivers could be plugged into a recharging station that restores the battery system to a fully charged state. Nevertheless, such battery systems necessarily increase the weight and bulk of the remote radio receivers, as a heavier battery system would provide greater storage capacity and longer operational life. Radio system designers must trade off weight of the receiver against its operational life, and have long sought ways to reduce the power requirements of a remote receiver in order to further extend the operational life without having to increase the battery system capacity.

Thus, it would be desirable to provide a remote CDMA radio receiver that draws reduced electrical current in order to maximize operational life between charging cycles. Since the digital signal processing circuitry that performs the de-spreading, tracking and bit synchronization of the received signals draws a substantial amount of electrical power, power usage could be reduced by improving the efficiency of the digital processing circuitry.

SUMMARY OF THE INVENTION

In accordance with the teachings of the present invention, a digital matched filter for a CDMA radio system is provided which has reduced power consumption over conventional systems.

The digital matched filter comprises a digital delay line having a plurality of successive delay stages adapted to receive a digital signal and propagate the digital signal therethrough at a fixed rate. A correlator is coupled to the digital delay line to correlate the digital signal to a predefined spreading code to provide a correlation signal representing a degree of correlation between the digital signal and the spreading code. The correlation signal comprises discrete time periods which reflect a high degree of correlation of the digital signal to the spreading code. A window control logic unit is coupled between the correlator and the bit synchronization unit to enable operation of the correlator only during sampling windows encompassing successive ones of the discrete time periods.

In an embodiment of the invention, a system clock provides a clock signal for the correlator. The window control logic unit provides an enabling signal to enable the clock signal to reach the correlator. An AND gate is adapted to receive the clock signal and the enabling signal, and provide an output coupled to clock input of the correlator. The enabling signal controls the operation of the correlator so that it operates only during the correlation time windows.

A more complete understanding of the windowed digital matched filter circuit for a CDMA radio will be afforded to those skilled in the art, as well as a realization of additional advantages and objects thereof, by a consideration of the following detailed description of the preferred embodiment. Reference will be made to the appended sheets of drawings which will first be described briefly

DETAILED DESCRIPTION OF THE PREFERRED EMBODIMENT

The present invention satisfies the need for a remote CDMA radio receiver that draws reduced electrical current by increasing the efficiency of the digital processing circuitry. In the detailed description that follows, like element numerals are used to describe like elements illustrated in one or more of the figures.

Figure 1:
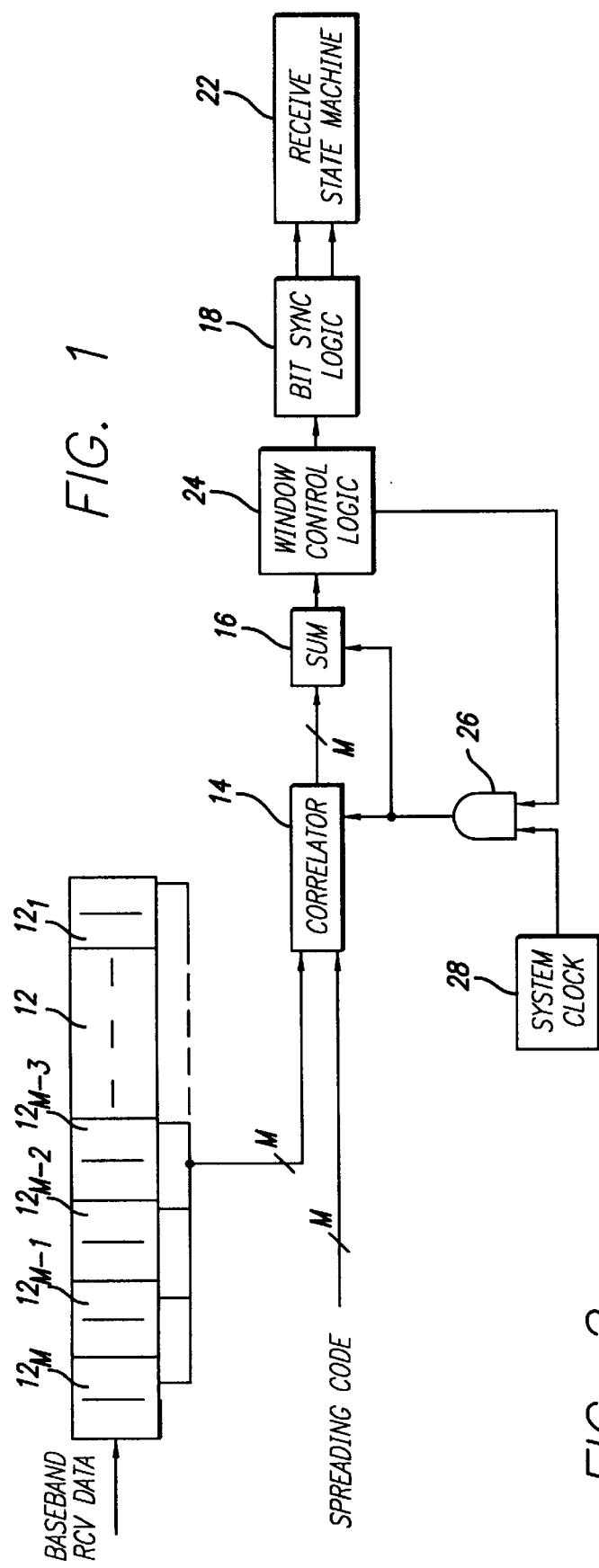
FIG. 1 is a block diagram illustrating a digital matched filter an processing circuitry for a CDMA radio receiver according to an embodiment of the present invention.

Referring first FIG. 1, an embodiment of a digital matched filter for a CDMA radio receiver is shown. As generally known in the art, a CDMA radio receiver receives an RF signal, and downconverts the RF signal to a baseband signal by multiplying the received signal by a carrier frequency generated by a local oscillator. The downconverted signal is then converted from analog to digital by an analog-to-digital converter, and may also be filtered by a low pass filter to remove any aliasing noise. Thereafter, the received signal is changed to the form of a multiple-bit digital signal having a chipping rate of the spreading code originally used to modulate the digital information of the signal. The received signal may additionally include two signal components, called the I channel and the Q channel, having phases that are 90° from each other. The separate I and Q signal components would be downconverted and filtered in the same manner described above to yield multiple-bit digital signals. It should be appreciated that these well known aspects of a CDMA receiver would be included in an operational system. To simplify the present detailed description, further description of these well known aspects is omitted.

The digital matched filter of the present invention includes a digital delay line 12, a correlator 14, and a summing device 16. The digital delay line 12 may comprise a conventional shift register having a plurality of distinct delay stages $12_M$–$12_1$. Each one of the delay stages $12_M$–$12_1$ provides a delay of less than one half the period of the expected spreading code clock, or the chipping rate, in order to satisfy the Nyquist sampling theorem. The delay line 12 receives a baseband signal that is biphase-modulated by a code sequence, or spreading code, so that phase reversals occur at each high/low transition in the code. The signal propagates down the delay line 12 through a series of successive shifts at a rate corresponding to the chipping rate. There are M delay stages $12_M$–$12_1$ which correspond to the M bins of the spreading code.

At a rate greater than twice the chipping rates the data values contained in the delay stages $12_M$–$12_1$ are sampled through tapped connections with the correlator 14. The correlator 14 determines whether the signal contained in the delay line 12 correlates to the spreading code. The correlator 14 may be comprised of M exclusive-OR logic gates which compare the signals contained in each of the respective delay stages $12_M$–$12_1$ to the corresponding chips of the spreading code. The summing device 16 sums the M outputs of the correlator 14 to provide a sum value that is proportional to the degree of correlation between the received signal and the spreading code for each of the M bins within the period of a single data bit.

Figure 2:
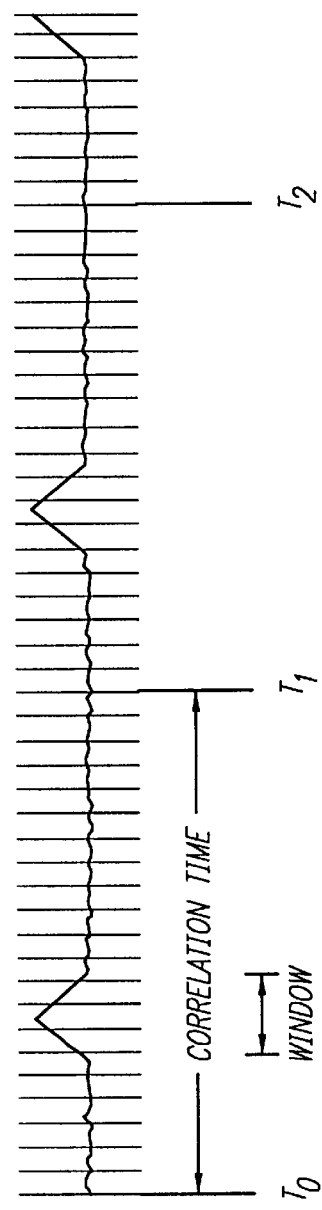
FIG. 2 is a graph illustrating an output signal of the digital matched filter showing correlation between the received data and the spread code.

FIG. 2 illustrates graphically the output sum value signal provided by the summing device 16. The periodic peaks in the signal correspond to correlations between the digital signal and the spreading code. Between the peaks, the signal remains nominally at zero due to the absence of correlation between the digital signal and the spreading code, with the minor fluctuations of the signal level being caused by random correlations of the digital signal with individual chips of the spreading code. The true correlations, or signal peaks, occur at the frequency of the information signal, and are used to detect valid data. As shown in FIG. 2, a single correlation period corresponds to M shifts of the digital signal through the delay line 12, or a single period of the information clock signal. The correlation period is divided into M discrete intervals which each correspond to a single period of the spreading code clock. FIG. 2 illustrates three consecutive correlation periods that begin respectively at times $T_0$–$T_2$.

Returning now to FIG. 1, a window control logic unit 24 passes the sum value from the summing device 16 to the bit synchronization logic unit 18 during the discrete window periods surrounding the true correlations, as shown in FIG. 2. The operation of the window control logic unit 24 is described in greater detail below. The bit synchronization logic unit 18 monitors the sum signal provided by the summing device 16 to determine whether a correlation is established between the spreading code and the received signal. Upon detection of such a correlation, the bit synchronization logic unit 18 synchronize the timing of the digital matched filter to the received signal by generating a data output containing despread digital information recovered from the received signal and a regulated clock output to which the data output is synchronized. After synchronization with the received signal has been achieved, the bit synchronization logic unit 18 may adjust the propagation rate of the delay line 12 to match the incoming code chipping rate as precisely as possible. The data and clock outputs are then provided to a receiver state machine 22, which combines the information being transmitted into packets that are further processed by downstream signal processing circuitry.

As known in the art, CDMA receivers can draw an exceptionally high amount of electrical current due in part to the power requirements of the digital matched filter. Complementary Metal Oxide Semiconductor (CMOS) circuitry is the most widely used technology for the digital portion of the receiver, and power consumption within CMOS circuitry is a function of the switching rate of a gate, the gate size, the supply voltage and the number of gates. As will be appreciated from the foregoing discussion, the digital matched filter includes a high number of gates that are switched at a high rate. Particularly, to satisfy the Nyquist sampling criterium, the digital data must be sampled at twice the data rate or higher. For example, a received CDMA signal modulated at 1 MHz with an eleven bit spreading code must be sampled at a rate of at least 22 MHz. After the signal is de-spread, the recovered digital data is processed at a clock rate of 1 MHz. These functions necessarily draw a relatively high level of electrical current.

In conventional CDMA receivers, the digital matched filter is always operating, even when no correlated data is being received. In the present invention, however, the clocking of certain of the circuitry of the digital matched filter is effectively stopped in between correlation times to cause the circuitry to go into a virtual zero power mode without degrading CDMA receiver performance. While it is not essential that the receiver of the present invention be implemented with CMOS circuitry, it should be appreciated that the power savings aspects of the present invention would provide the greatest benefit from using CMOS circuitry.

In an embodiment of the invention, the window control logic unit 24 controls the application of the system clock to portions of the digital matched filter. The window control logic unit 24 has a control output coupled to an input of an AND logic device 26. A second input to the AND logic device 26 is coupled to a system clock 28 that provides a clock signal for the correlator 14 and the summing device 16. When the control output from the window control logic unit 24 is at a high logic state, the clock signal passes from the system clock 28 to both the correlator 14 and the summing device 16 through the AND logic device 26. Conversely, when the control output is at a low logic state, the clock signal is prevented from reaching either the correlator 14 or the summing device 16.

Figure 3:
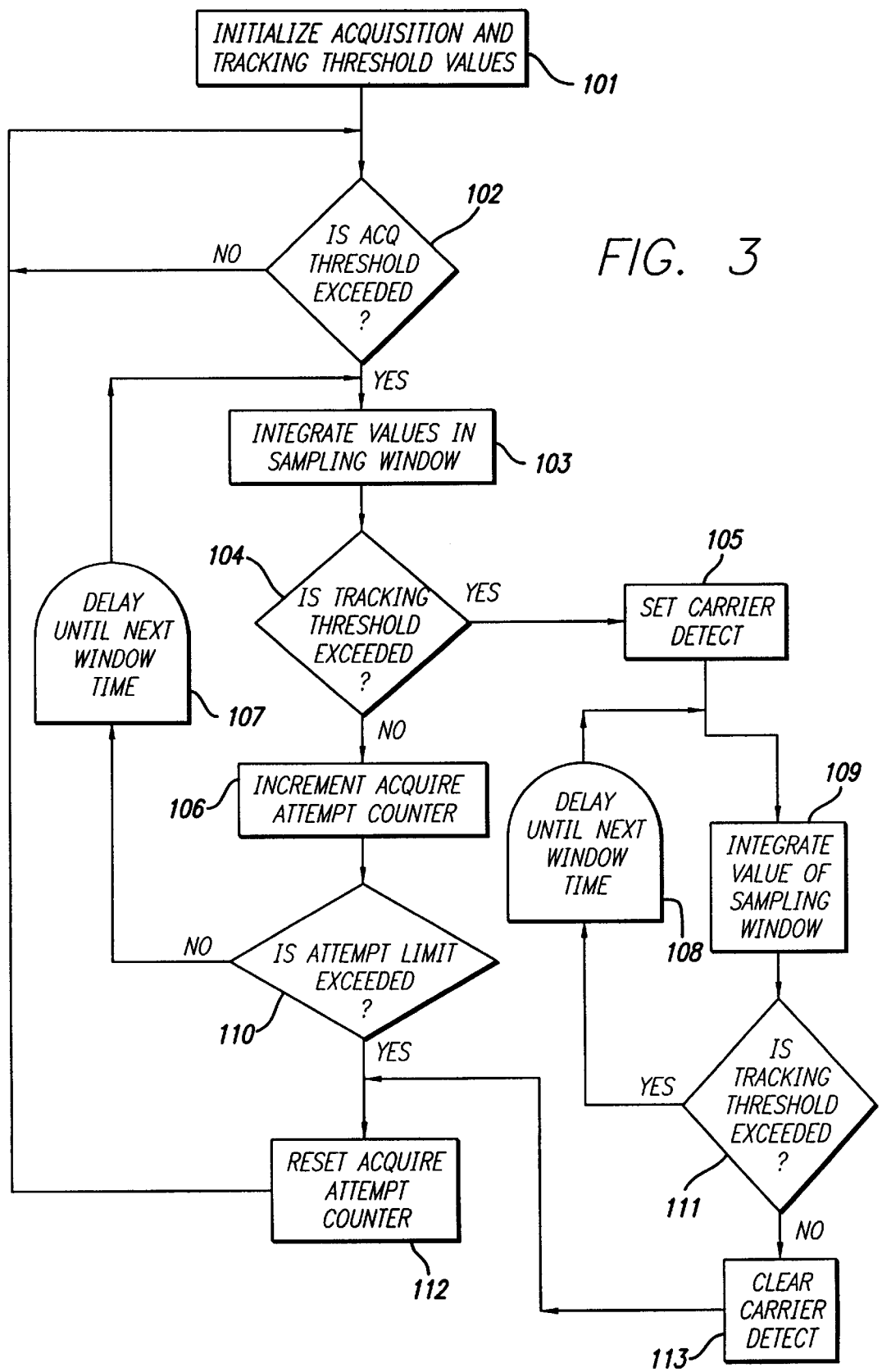
FIG. 3 is a flow diagram illustrating operation of window control logic for acquiring and correlating the output signal of the digital matched filter to the spreading code during a correlation window.

Referring now to FIG. 3, a flow chart illustrating the operation of the window control logic unit 24 is shown. At step 101, acquisition and tracking threshold values are initialized in the window control logic unit 24 during initialization of the CDMA receiver. The acquisition and tracking threshold values define two energy levels of the digital signal from the summing device 16 that are used to acquire and correlate with a received signal, respectively. The threshold values may be modified as desired to alter the operating characteristics of the CDMA receiver, as will be apparent from the description that follows.

After initialization of the threshold values, the CDMA receiver is in an acquisition mode, and is waiting for a signal to be received that breaks the acquisition threshold. The digital matched filter is operating normally while the CDMA receiver is in the acquisition mode. In step 102, periodic digital samples of the signal from the summing device 16 are compared with the acquisition threshold value at the chipping rate to determine if the acquisition threshold level is exceeded. The acquisition threshold level is set to an energy level that is sufficiently higher than the nominal zero level so that minor fluctuations of the received signal, such as due to noise, do not trigger a false acquisition. As long as the energy level of the samples remains below the acquisition threshold value, the window control logic unit 24 continues to loop successive samples through step 102.

When the energy level of one of the samples exceeds the acquisition threshold value, this may indicate the start of a received message packet. The particular sample value, or bin, is added to an integrated sum of sample values for that particular bin at step 103. Similarly, integrated sums are made for the bins adjacent to the bin that broke the acquisition threshold, defining a multiple-bin sampling window, as shown in FIG. 2. For example, if the sample at bin six broke the acquisition threshold and a five bin wide sampling window is used, then integrated sums for bins four through eight are formed. The integrated sums from step 103 are compared to a tracking threshold value at step 104 to determine if the tracking threshold value is exceeded. Ordinarily, a received message packet begins with a preamble having a multiple bit code, such as a Barker code. Therefore, the particular bin and adjacent bins are integrated over several bit times to verify that an actual message packet is being received. If, for example, a noise spike caused the acquisition threshold to be exceeded, then there would be no signal in subsequent bit times, and the integrated sum would remain below the tracking threshold value. Fractional feedback terms are necessarily applied to the integrated sums formed at step 103 to prevent the integrated sums from growing too large, so that the integrated sums decay as the signal in subsequent bit times drops below the acquisition threshold.

As long as the integrated sum remains below the tracking threshold value, the window control logic unit 24 remains in a loop including steps 106, 110 and 107. At step 106, an acquire attempt counter used to track the number of loops is incremented, and at step 110, the count value of the counter is compared to a predetermined upper limit. For each loop, a time delay is provided in which the portions of the digital matched filter are disabled by operation of the window control logic unit 24 until the particular bins of the sampling window are received for a subsequent bit time. In the example given above, integrated sums for bins four through eight are formed, and the correlator 14 and summing device 16 may be disabled during the time period of all other bins outside the sampling window. Since the chipping rate and code length are known by the CDMA receiver, the duration of the time delay can be readily determined.

The tracking threshold should be reached within a predetermined number of bit times, such as three bit times. If the counter reaches the upper limit before the tracking threshold is reached, then it is likely that there was a false acquisition, such as due to noise, and not the start of an actual message packet. The acquire attempt counter is reset at step 112, and the entire process begins anew with the CDMA receiver returning to the acquisition mode. Alternatively, if the counter is below the upper limit, the integration loop is returned to step 103 after applying the delay at step 107 discussed above.

If the tracking threshold is exceeded at step 104, the carrier detect flag is set at step 105. By using a preloaded value in the integrated sums for the bins of the sampling window of the first loop, the carrier detect can be achieved more quickly once the acquisition threshold has been exceeded. As in the first loop, the particular sample bin and adjacent bins within a sampling window is added to respective integrated sums at step 109 which include fractional feedback terms to permit the integrated sums to decay over a number of bit times. The integrated sum from step 109 is again compared to the tracking threshold value at step 111 to determine if the tracking threshold value is exceeded. This time, the tracking threshold value is used to maintain the carrier detect condition, and if the integrated value exceeds the tracking threshold value, valid data is being received by the CDMA receiver. The integrated sum is then provided to the bit synchronization logic unit 18 of FIG. 1 for further processing. As before, at step 108 a time delay is provided in which the correlator 14 and summing device 16 are shut off by operation of the window control logic unit 24 until the particular bins of the acquisition window are received in a subsequent bit time. When the integrated sums for the bins of the sampling window drop below the tracking threshold, indicating loss of receipt of the message due to termination of a message packet or signal interference, the carrier detect flag is turned off at step 113. Thereafter, the CDMA receiver is again returned to acquisition mode as described above.

It should be appreciated that between each sampling window, the control output signal from the window control logic unit 24 is set to a low state to discontinue operation of the digital matched filter by shutting off system clock to the correlator 14 and the summing device 16. During the sampling window, and while the CDMA receiver is in the acquisition mode, the control output signal from the power management logic unit 24 is at a high state to enable normal operation of the digital matched filter. Thus, substantial power savings can be realized during the period of time in between the sampling windows. The longer the spreading code of the received signal, the greater the disabled time of the digital matched filter circuitry and lower power consumption per received data bit. It should be appreciated that the power management logic unit could be adapted to disable/enable the system clock to additional or fewer elements of the digital matched filter circuitry depending on the operational needs of the CDMA receiver and the associated power usage requirements.

An additional benefit of the present invention is that the windowed integration minimizes the gate count of the CMOS circuitry. The number of integrated sum values that calculated is a function of the sampling window size, rather than the spreading code length in conventional CDMA receiver digital matched filters. While the size of the sampling window, and thus the number of integrated sum values, is increased for longer spreading codes, there is still a substantial savings in the number of gates required. For example, an eleven-bit spreading code sampled at twice the chipping rate requires twenty-two integration bins. Assuming eight-bit resolution for each integration bin, there would need to be approximately five thousand gates to provide the integration bins. With a forty-four-bit spreading code, the number of integration bin gates increases to twenty thousand gates. Conversely, a five bin sampling window would require only one thousand gates. The tremendous savings in gate count translates to reduced real estate on the application specific integrated circuit (ASIC), with consequent reductions in cost, operating temperature, power usage, etc.

Having thus described a preferred embodiment of a windowed digital matched filter circuit for a CDMA radio, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A digital matched filter for a CDMA radio system comprises:
    a digital delay line having a plurality of successive delay stages adapted to receive a multiple bit digital signal and propagate said digital signal therethrough at a fixed rate;
    a correlator coupled to said digital delay line to correlate said digital signal to a predefined spreading code to provide a plurality of signals indicating correspondence between individual bits of said digital signal and respective chips of said spreading code;
    a summing device coupled to said correlator to combine said plurality of signals into a summed signal representing a degree of correlation of said digital signal to said spreading code; and
    a window control unit operatively coupled to said summing device to enable operation of at least one of said correlator and said summing device only during discrete time periods of said summed signal having a high degree of correlation of said digital signal to said spreading code, and disable operation of at least one of said correlator and said summing device between successive ones of said discrete time periods.

2. The digital matched filter of claim 1, wherein said correlator further comprises a plurality of logic gates each having a first input coupled to a corresponding one of said stages of said digital delay line and a second input coupled to a corresponding bit of said spreading code.

3. The digital matched filter of claim 2, wherein said logic gates further comprise exclusive-OR logic gates.

4. The digital matched filter of claim 2, wherein said logic gates further comprise CMOS logic gates.

5. The digital matched filter of claim 1, further comprising a system clock providing a clock signal for said correlator and said summing device, said window control unit providing an enabling signal to enable said clock signal to reach said correlator and said summing device.

6. The digital matched filter of claim 5, further comprising a bit synchronization unit coupled to said window control unit to receive said correlation signal and derive a data signal therefrom, and an AND gate adapted to receive said clock signal and said enabling signal, said AND gate further having an output coupled to clock inputs of said correlator and said bit synchronization unit.

7. The digital matched filter of claim 1, wherein said window control unit further comprises means for detecting an acquisition state of a received digital signal.

8. A digital matched filter for a CDMA radio system comprises:
    a digital delay line having a plurality of successive delay stages adapted to receive a multiple bit digital signal and propagate said digital signal therethrough at a fixed rate;
    a correlate coupled to said digital delay line to correlate said digital signal to a predefined spreading code to provide a plurality of signals indicating correspondence between individual bits of said digital signal and respective chips of said spreading code;
    a summing device coupled to said correlator to combine said plurality of signals into a summed signal representing a degree of correlation of said digital signal to said spreading code;
    a window control unit operatively coupled to said summing device to enable operation of at least one of said correlator and said summing device only during discrete time periods of said summed signal having a high degree of correlation of said digital signal to said spreading code, and disable operation of at least one of said correlator and said summing device between said successive ones of said discrete time periods; and
    a bit synchronization unit coupled to said window control unit to receive said correlation signal and derive a data signal therefrom.

9. A digital matched filter for a CDMA radio system, comprises:
    a digital delay line having a plurality of successive delay stages adapted to receive a digital signal and propagate said digital signal therethrough;
    means for correlating said digital signal to a predefined spreading code to provide a summed signal reflecting a degree of correlation;
    means for deriving a data signal and a clock signal from said summed signal, said summed signal comprising discrete time periods which reflect a high degree of correlation of said digital signal to said spreading code; and
    means for enabling operation of said correlator only during successive ones of said discrete time periods.

10. A digital matched filter for a CDMA radio system, comprises:
    a digital delay line having a plurality of successive delay stages adapted to receive a digital signal and propagate said digital signal therethrough;
    means for correlating said digital signal to a predefined spreading code to provide a summed signal reflecting a degree of correlation;
    means for deriving a data signal and a clock signal from said summed signal, said summed signal comprising discrete time periods which reflect a high degree of correlation of said digital signal to said spreading code; and means for enabling operation of said correlator only during successive ones of said discrete time periods, wherein said enabling means further comprises means for estimating timing of a next successive one of said discrete time periods.

11. The digital matched filter of claim 10, wherein said enabling means further comprises means for defining a sampling window around said estimated timing of a next successive one of said discrete time periods.

12. The digital matched filter of claim 9, further comprising a system clock providing a clock signal for said correlator, said enabling means providing an enabling signal to enable said clock signal to reach said correlator.

13. The digital matched filter of claim 9, wherein said correlating means further comprises:

a plurality of logic gates each having a first input adapted to sample a corresponding one of said stages of said digital delay line and a second input coupled to a corresponding bit of said spreading code; and a summing device coupled to respective outputs of each of said plurality of logic gates to provide said summed signal.

14. A method for reducing power consumption in a CDMA radio system, comprises:

propagating a received digital signal through a digital delay line having a plurality of successive delay stages;

correlating said digital signal to a predefined spreading code to provide a correlation signal reflecting a degree of correlation of said digital signal to said spreading code;

deriving a data signal and a clock signal from said correlation signal, said correlation signal comprising discrete time periods which correspond to correlation of said digital signal to said spreading code; and disabling performance of said correlating step between said discrete time periods.

15. The method of claim 14, further comprising providing a clock signal for performing said correlating step.

16. The method of claim 15, wherein said disabling step further comprises providing a signal to disable performance of said step of providing a clock signal.

17. The method of claim 14, wherein said disabling step further comprises determining whether said correlation signal exceeds an acquisition threshold.

18. A method for reducing power consumption in a CDMA radio system, comprises:

propagating a received digital signal through a digital delay line having a plurality of successive delay stages;

correlating said digital signal to a predefined spreading code to provide a correlation signal reflecting a degree of correlation of said digital signal to said spreading code;

deriving a data signal and a clock signal from said correlation signal, said correlation signal comprising discrete time periods which correspond to correlation of said digital signal to said spreading code; and disabling performance of said correlating step between said discrete time periods, wherein said disabling step further comprises determining whether said correlation signal exceeds a tracking threshold.

19. The method of claim 14, wherein said disabling step further comprises providing an integrated sum of said correlation signal.

20. The method of claim 19, wherein said disabling step further comprises comparing said integrated sum of said correlation signal to a threshold value.

21. The method of claim 14, wherein said disabling step further comprises defining a sampling window that encompasses said discrete time periods.

* * * * *